United States Patent [19]

Schreiber et al.

[11] 4,059,776

[45] Nov. 22, 1977

[54] ELECTRIC MOTOR BRUSH MOUNTING

[75] Inventors: Robert E. Schreiber; Edward J. Zelt, both of St. Marys, Pa.

[73] Assignee: Stackpole Carbon Company, St. Marys, Pa.

[21] Appl. No.: 678,023

[22] Filed: Apr. 19, 1976

[51] Int. Cl.² .......................................... H02K 13/00
[52] U.S. Cl. .................................................. 310/242
[58] Field of Search ............... 310/239, 241, 242, 245, 310/246, 247, 248

[56] References Cited

U.S. PATENT DOCUMENTS

| 3,474,274 | 10/1969 | Groschopp | 310/242 |
|---|---|---|---|
| 3,527,971 | 9/1970 | Means | 310/239 |
| 3,579,009 | 5/1971 | Walter | 310/242 |
| 3,656,016 | 4/1972 | Jacyno | 310/242 |
| 3,656,018 | 4/1972 | Maher | 310/242 |

Primary Examiner—R. Skudy
Attorney, Agent, or Firm—Brown, Murray, Flick & Peckham

[57] ABSTRACT

An electric motor frame has a brush-receiving recess beside the commutator. The recess has top and bottom walls and an insulating brush housing is disposed in the recess where it is held in fixed position. Slidable lengthwise in the housing is a brush, between one side of which and the housing there is a stationary metal strip that extends substantially full length of the housing and has an outer end portion extending transversely of the brush. Compressd between this end portion of the strip and the brush is a coil spring that holds the brush against the commutator. An electrical conductor engages the strip, while a flexible wire electrically connects the strip with the brush. The brush housing is provided with at least one exterior rib extending lengthwise of it, and one of the walls of the frame recess has a groove in it that snugly receives the rib to accurately position the housing in the frame.

12 Claims, 9 Drawing Figures

ELECTRIC MOTOR BRUSH MOUNTING

It is among the object of this invention to provide an electric motor with a brush holder assembly which can be produced at low cost, which is easy to install, which requires only one fastener to hold it in place, which is easily connected into an electric circuit and which uses materially less metal than heretofore.

The invention is illustrated in the accompanying drawings, in which

Figure 1:
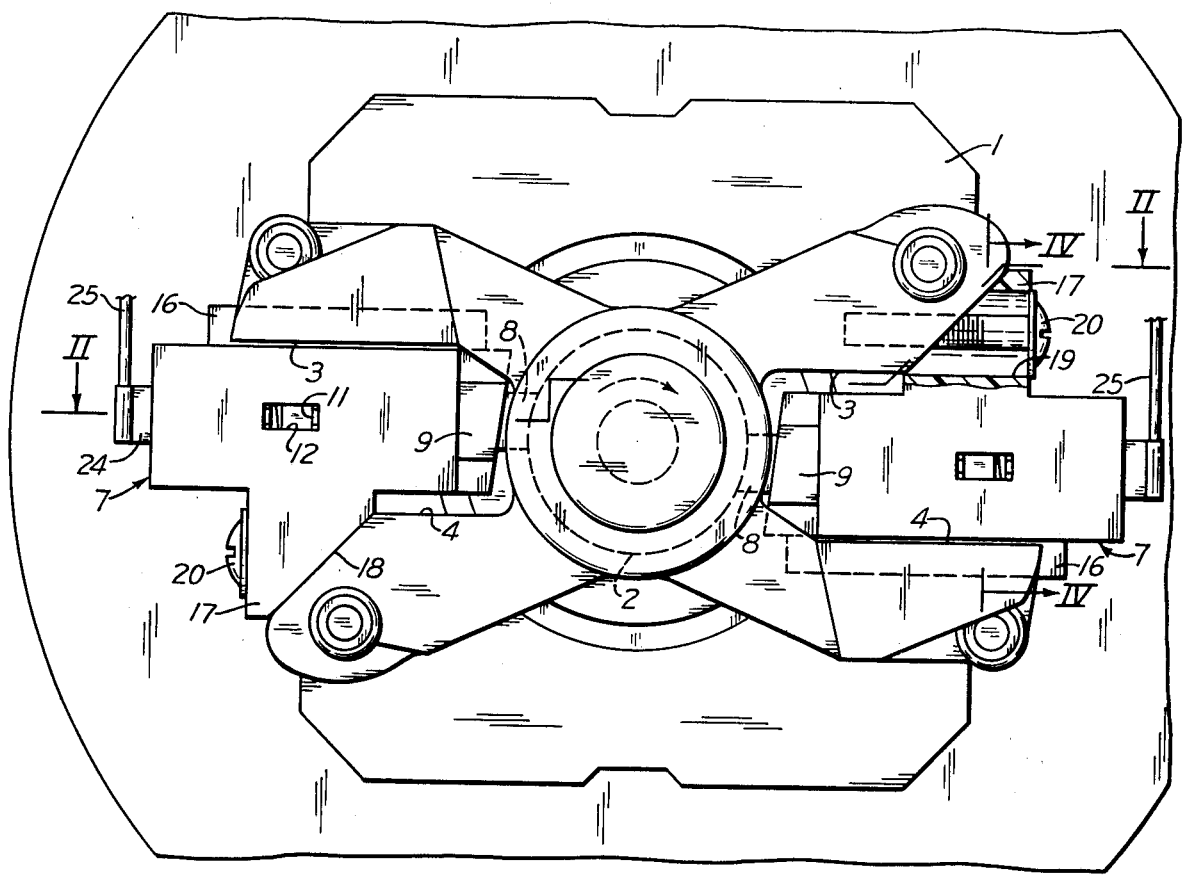
FIG. 1 is an end view of a motor provided with air brush mountings.
Figure 2:
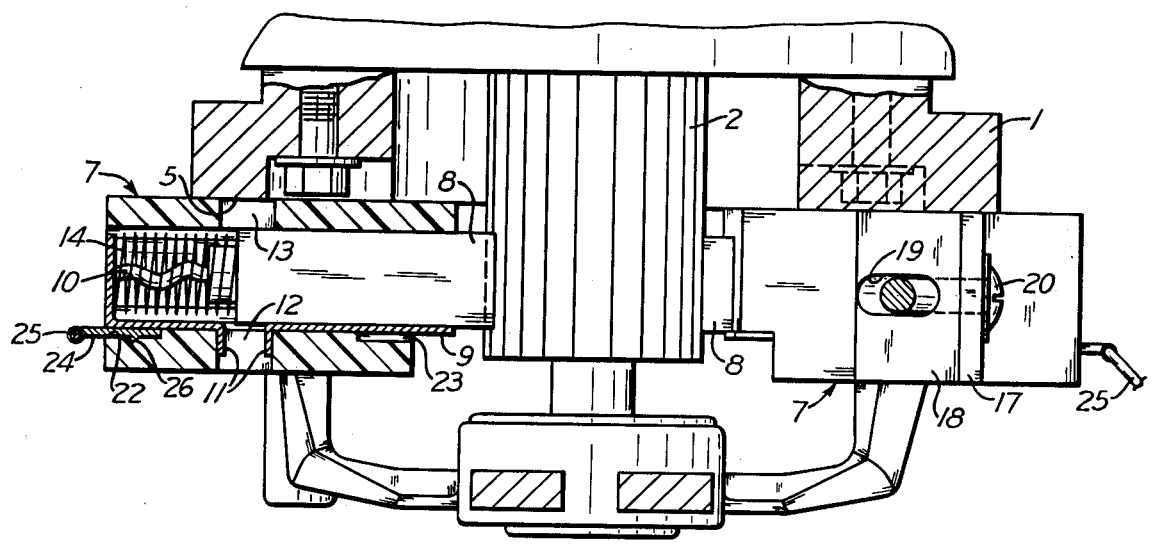
FIG. 2 is a fragmentary horizontal section taken on the lines II—II of FIG. 1.
Figure 3:
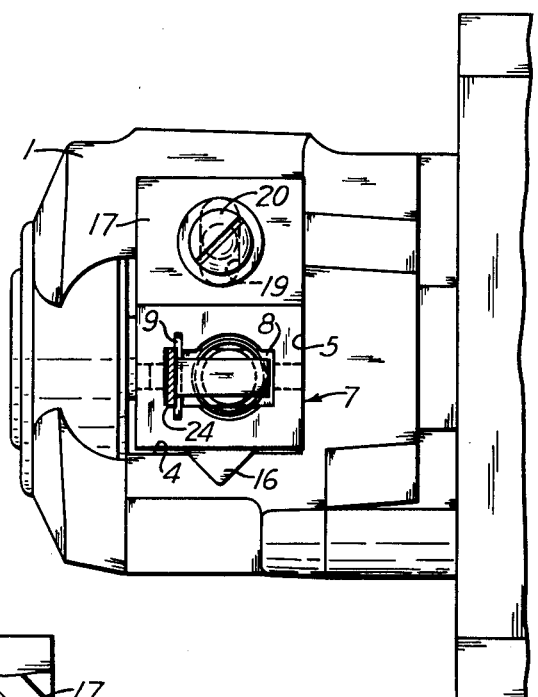
FIG. 3 is a fragmentary side view.

Referring to FIGS. 1 to 3 of the drawings, an electric motor includes a frame 1, in which the commutator 2 of the motor is rotatably mounted. At opposite sides of the commutator the frame is provided with brush-receiving recesses. Each of these recesses has upper and lower walls 3 and 4 and an inner wall 5 connecting them. No outer wall is required. Disposed in each recess is a brush holder that is made of insulating material, such as a molded plastic. The holder is a tubular housing 7 open at both ends. Inside the housing there is a brush 8 that generally is rectangular in cross section.

Figure 4:
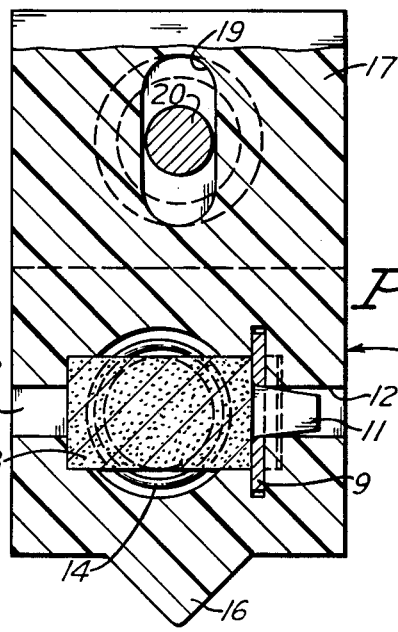
FIG. 4 is an enlarged cross section taken on the line IV—IV of FIG. 1.

As shown in FIG. 2, between one side of the brush and the adjoining side of its housing there is a metal strip 9 that extends the full length of the housing. The outer end portion of this strip is bent across the outer end of the brush housing and is connected by a flexible wire 10 with the adjacent end of the brush. The metal strip is prevented from moving lengthwise of the housing by means of struck out tongues 11 that extend into a hole 12 through the adjoining side of the housing. These tongues lie in the plane of the strip when it is inserted in the housing, and then they are bent outwardly into the hole by means of a tool (not shown) inserted in a hole 13 in the opposite side of the housing and pressed against the tongues to bend them. The brush is pressed against the commutator by a coil spring 14 compressed between the brush and the end portion of the strip. The central portions of the upper and lower sides of the passage through the brush housing are concave to accommodate the cylindrical coil spring, as shown in FIG. 4.

To properly align the brush holder with the commutator, one side of the brush housing, such as the top or the bottom, is provided with an exterior rib 16 extending lengthwise of the housing. This rib fits in a groove of corresponding shape in the adjoining wall of the frame recess, so the brush housing can be moved lengthwise for insertion or removal but not sideways. To anchor the brush holder in place, the side of the housing opposite to rib 16 is provided with a vertical projection 17 that has a surface 18 inclined from the outer end of the projection inwardly toward the inner end of the housing. This inclined surface fits against a complementary inclined surface on one wall of the frame recess.

The vertical projection is provided with a vertical slot 19 extending laterally through it and registering with a threaded opening in the frame. A screw 20 extends through the slot and into the frame opening for drawing the inclined surface 18 of the projection up tight against the frame. When this is done, the wedging effect that it produces forces rib 16 into tight engagement with the wall of the groove in the frame to hold the brush holder firmly in place. The rib is triangular in cross section, or tapered or curved, so that it will wedge itself in the groove.

To connect the brush in an electric circuit, the opposite ends of the brush housing are provided beside metal strip 9 with longitudinal slots 22 and 23, as shown in FIG. 2, one wall of which is formed by the strip. A metal tongue 24 attached to an electric wire 25 is inserted in one of the slots for engagement with the metal strip. To hold the tongue in place, it can be provided with a struck-up tooth 26 that will dig into the side of the slot and prevent the tongue from being pulled out. It will be seen that only one screw is required in order to fasten the brush holder in place. This invention also has the advantage of a trailing angle design for better brush stability, as shown in FIG. 1.

Figure 5:
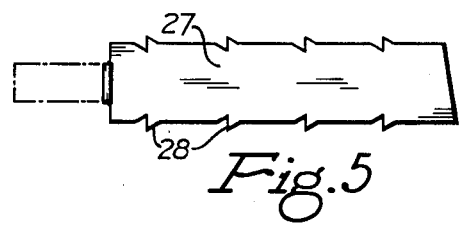
FIG. 5 is a side view of a modified metal strip.
Figure 9:
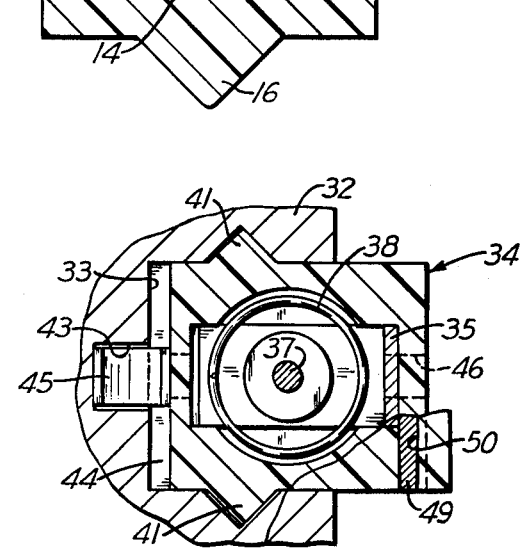
FIG. 9 is an enlarged cross section taken on the line IX—IX of FIG. 6.
Figure 8:
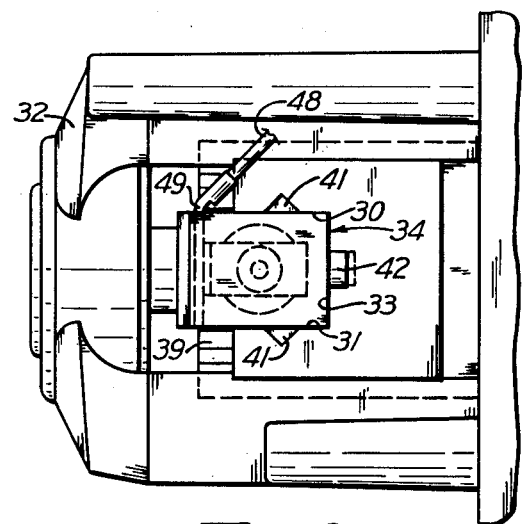
FIG. 8 is a fragmentary side view.
Figure 6:
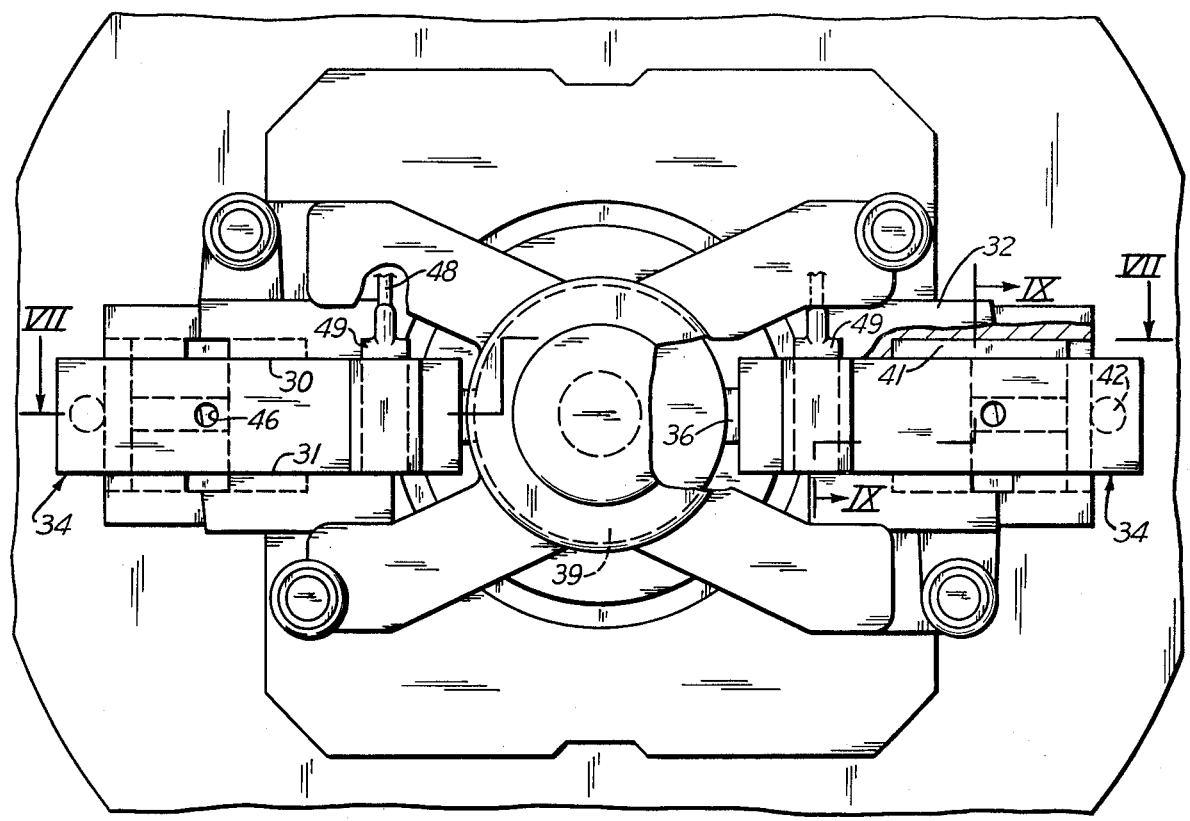
FIG. 6 is an end view of a modified motor and brush mounting.

Instead of having tongues struck out of the metal strip 9 into a hole in the side of the brush housing, as shown in FIG. 5, the opposite edges of such a strip 27 can be serrated or provided with teeth 28 that will dig into the brush housing when the strip is forced into place, to hold the strip in place.

Figure 7:
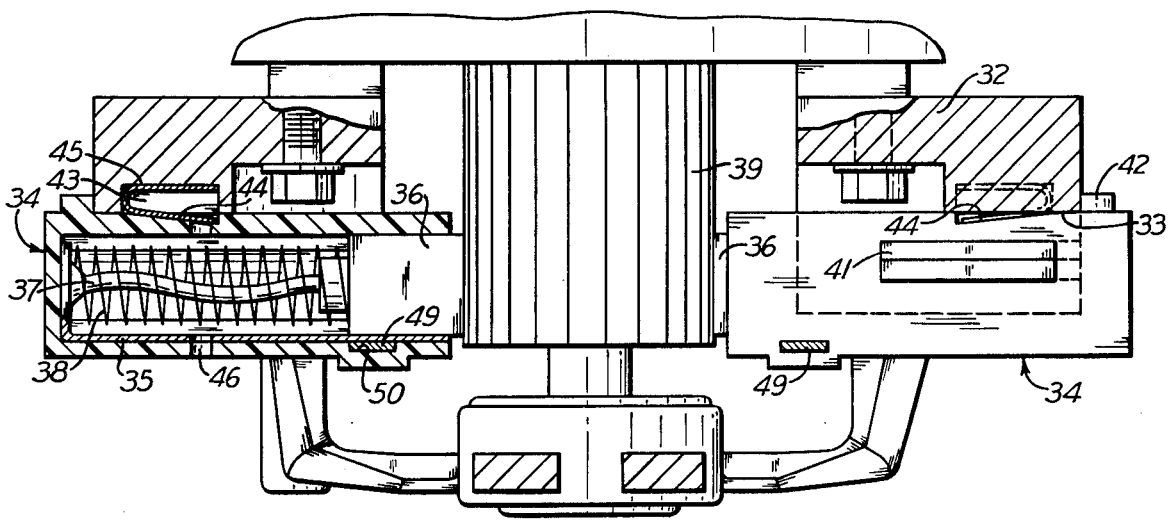
FIG. 7 is a fragmentary horizontal section taken on the line VII—VII of FIG. 6.

In the modification shown in FIGS. 6 to 9, the top and bottom walls 30 and 31 of each brush-receiving recess in the motor frame 32 are connected by an inner side wall 33. The insulating brush housing 34 is closed at its outer end and contains a metal strip 35 between one side of the housing and the brush 36 that is slidably disposed inside the housing. The bentover outer end of the strip engages flat against the end wall of the housing as shown in FIG. 7 and is connected by a flexible wire 37 with the brush. A coil spring 38 compressed between the end of the strip and the brush presses the brush against the commutator 39.

The top and bottom of the brush housing are provided with exterior ribs 41 extending lengthwise of it and fitting in grooves of corresponding shape in the top and bottom walls of the frame recess. Preferably, these ribs and grooves are triangular in cross section. The outer end of the brush housing is provided with a laterally projecting stop 42 that engages the side of the motor frame to limit movement of the housing toward the commutator. To prevent the housing moving in the opposite direction, the inner side wall 33 of the frame recess is provided with a socket 43 beside a notch 44 in the side of the housing. The end of this notch nearest the commutator forms a shoulder. Disposed in the notch and socket is a spring clip 45 that holds the brush housing and frame together. Preferably, the clip is a U-shape member with one leg disposed in the housing notch and engaging its shoulder. The brush holder is assembled with the motor frame by first placing the spring clip in the frame socket and then sliding the housing inwardly across it until the clip snaps into the housing notch. At practically the same moment the housing stop 42 engages the frame, with the result that the housing cannot be moved lengthwise in either direction. The spring clip is the only element that fastens the brush housing in the frame. To remove the brush holder from the frame, a suitable instrument, such as a small rod, can be inserted in holes 46 in the opposite sides of the brush housing and in the metal strip, all of these holes being aligned with the inner end of the spring clip. By pressing the rod against the clip the inner end of the clip can be pushed out of housing notch 44 far enough to permit the housing to be withdrawn from the motor frame.

For connecting the brush into an electric circuit, a wire 48 is joined to a flat metal tongue 49 that is inserted in either end of a recess 50 in the brush housing. The inner side of this recess is exposed to the metal strip, and the metal tongue engages that strip.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In an electric motor having a frame and a commutator rotatably mounted therein, the frame having a brush-receiving recess beside the commutator provided with top and bottom walls, a brush housing made of insulating material disposed in said recess, means holding said housing in fixed position in the recess, a brush disposed in the housing and slidable lengthwise thereof, a stationary metal strip inside the housing between the brush and one side of the housing, the strip extending substantially full length of the housing and having an outer end portion extending transversely of the brush and spaced therefrom, one side of the strip engaging the brush and the other side of the strip engaging the housing, a coil spring compressed between said end portion and the brush for holding the brush against the commutator, a flexible wire electrically connecting the brush with said end portion of the strip, and an electrical conductor engaging said strip.

2. In an electric motor according to claim 1, said brush housing being provided with an exterior rib extending lengthwise thereof, and one of said walls of said frame recess having a groove in it extending laterally away from the commutator and snugly receiving said rib to accurately position said housing in the frame.

3. In an electric motor according to claim 1, the side edges of said strip being provided with teeth frictionally engaging the brush housing to hold the strip in place.

4. In an electric motor according to claim 1, one of said frame recess walls having a surface inclined toward the commutator, the brush housing being provided with a vertical projection having an inclined surface engaging said inclined frame surface, and said holding means including a screw extending through said projection and into the frame for clamping the projection against the frame, the inclination of said surfaces being such that when the screw is tightened the brush housing will be forced against the opposite side of the frame recess.

5. In an electric motor according to claim 4, said opposite side of the frame recess having a groove in it extending laterally away from the commutator, and the brush housing being provided with an exterior rib extending lengthwise thereof and seated in said groove.

6. In an electric motor according to claim 1, said frame recess having a side wall provided with a socket and the opposing side of said brush housing having a notch in it registering with said socket, the end of said notch adjacent said commutator forming a shoulder, said holding means including a spring clip disposed in said socket and engaging said shoulder to prevent said housing from moving longitudinally away from the commutator, and a stop member projecting laterally from the outer end portion of the housing and engaging the side of said frame to limit movement of the housing toward the commutator.

7. In an electric motor according to claim 6, in which said spring clip is U-shape with two legs, one leg being disposed in said socket and the other leg extending into said notch, and the free end of the latter leg engaging said shoulder.

8. In an electric motor according to claim 7, said brush housing and metal strip being provided with openings in its opposite sides aligned with said free end of said leg for receiving means to depress said free end to permit removal of the brush housing from the frame.

9. In an electric motor according to claim 1, the side wall of the brush housing beside said metal strip being provided with a transverse recess exposed to the strip and open at at least one end, and said electrical conductor extending into said open end and engaging the strip.

10. In an electric motor according to claim 1, the top and bottom of said brush housing being provided with exterior ribs extending lengthwise thereof and the top and bottom walls of said frame recess having grooves therein extending laterally away from the commutator and receiving said ribs, the frame recess having a side wall, and means pressing the brush housing away from said side wall to press said ribs against the sides of said grooves, whereby to accurately position the housing in the frame.

11. In an electric motor according to claim 1, the inside of said insulating housing being provided with opposed slots receiving the opposite side edges of said metal strip.

12. In an electric motor having a frame and a commutator rotatably mounted therein, the frame having a brush-receiving recess beside the commutator provided with top and bottom walls, a brush housing made of insulating material disposed in said recess and having a rectangular passage therein, means holding said housing in fixed position in the recess, a rectangular brush disposed in the housing passage and slidable lengthwise thereof with three sides of the brush engaging the housing, a stationary metal strip inside the housing between the brush and one side of the housing, the strip extending substantially full length of the housing and having an outer end portion extending transversely of the brush and spaced therefrom, one side of the strip engaging the fourth side of the brush and the other side of the strip engaging the housing, a coil spring compressed between said end portion and the brush for holding the brush against the commutator, a flexible wire electrically connecting the brush with said end portion of the strip, and an electrical conductor engaging said strip.

* * * * *